(12) United States Patent
Creaney et al.

(10) Patent No.: US 7,113,708 B1
(45) Date of Patent: Sep. 26, 2006

(54) DATA COMMUNICATIONS LINK

(75) Inventors: Stephen Creaney, Coatbridge (GB); Philip Lane, St. Albans (GB); Richard John Ferguson, Skelmorlie (GB); Thomas Crummey, London (GB)

(73) Assignee: Barr & Stroud Limited, Glasgow (GB)

( * ) Notice: Subject to any disclaimer, the term of this patent is extended or adjusted under 35 U.S.C. 154(b) by 0 days.

(21) Appl. No.: 09/437,004

(22) Filed: Nov. 9, 1999

(30) Foreign Application Priority Data

Nov. 17, 1998 (GB) ............................ 9825046.7

(51) Int. Cl.
*H04B 10/00* (2006.01)

(52) U.S. Cl. ........................... 398/162; 398/140

(58) Field of Classification Search ............. 359/154, 359/161, 173, 187; 398/140–162, 79–98, 398/182–201
See application file for complete search history.

(56) References Cited

U.S. PATENT DOCUMENTS

| | | | |
|---|---|---|---|
| 3,714,437 A * | 1/1973 | Kinsel | 398/185 |
| 4,399,566 A * | 8/1983 | Roullet et al. | 398/197 |
| 4,945,541 A * | 7/1990 | Nakayama | 372/31 |
| 5,345,230 A * | 9/1994 | Jackson et al. | 340/3.51 |
| 5,510,919 A * | 4/1996 | Wedding | 398/141 |
| 5,623,355 A * | 4/1997 | Olsen | 398/162 |
| 5,748,351 A | 5/1998 | Morimoto | |
| 5,790,293 A | 8/1998 | Frigo | |
| 5,801,860 A * | 9/1998 | Yoneyama | 359/124 |
| 5,822,099 A * | 10/1998 | Takamatsu | 359/110 |
| 5,892,858 A * | 4/1999 | Vaziri et al. | 385/2 |
| 5,923,450 A * | 7/1999 | Dugan et al. | 359/127 |
| 6,366,375 B1 * | 4/2002 | Sakai et al. | 359/115 |
| 6,522,436 B1 * | 2/2003 | Roberts et al. | 398/27 |

FOREIGN PATENT DOCUMENTS

| | | |
|---|---|---|
| EP | 0 385 649 A1 | 9/1990 |
| EP | 0 700 178 A2 | 3/1996 |
| JP | 8-79186 A | 3/1996 |

* cited by examiner

*Primary Examiner*—Agustin Bello
(74) *Attorney, Agent, or Firm*—Alston & Bird LLP

(57) ABSTRACT

A data communications link uses a multi-power level optical source to encode and transmit data words along a communications channel to a receiver station. A received signal condition monitor senses the level of a pre-determined characteristic and transmits a control signal to a controller which controls the power output of the optical source.

13 Claims, 6 Drawing Sheets

DATA COMMUNICATIONS LINK

This invention relates to data communications links and particularly but not exclusively to short range (i.e., subkilometre) point-to-point links incorporating an optical communications channel.

For short range data communications links along an optical communication channel signal attenuation is not normally a limiting factor. The limiting factor is normally bandwidth but this problem can be overcome by using a multiple optical power level data encoding scheme in which each transmitted symbol, according to its power level, signifies a sequence of data bite. Unfortunately such multiple power level schemes give rise to increased symbol error rates arising partly from variation of the overall power output level of the transmitter and partly from variation of the separation between individual power levels in the scheme.

It is an object of the present invention to provide a new and improved form of data communications link.

According to the present invention there is provided a data communications link comprising a data transmitter station coupled by an optical communications channel to a data receiver station, wherein the data transmitter station includes a multi-power-level optical source connected to receive data words of n digital bits and arranged to encode the bits of each word into one of m optical power levels, the multi-power-level output signal of the optical source being transmitted along the optical communications channel to the data receiver station, paid data receiver station including a data-decoding receiver arranged to receive and decode said multi-power-level optical signal into n bit digital words, and wherein said receiver station further comprises a received-signal condition monitor coupled by a control channel to a control device located in the data transmitter station, said condition monitor being arranged to sense the level of a predetermined characteristic of the signal received by the data-decoding receiver and consequently to transmit a control signal along the control channel to the control device, said control device being adapted to control the power output of the optical source consistent with achieving a predetermined sensed level of said predetermined characteristic.

The predetermined characteristic may be the DC level or the average optical power level of the signal received by the receiver, the sensed level being compared against a control or reference level to establish a difference and the arrangement in such that the control signal attempts to null that difference or at least to keep the difference within narrow predetermined limits.

Alternatively the predetermined characteristic may be the individual bit content of a multibit test word transmitted at preselected times. In this case the condition monitor is preprogrammed with the bits of the test word against which the individual bits of the transmitted test word are compared and in the event of a difference the control signal is arranged to increase or decrease the power output of the transmitter in order to reduce the error.

The control channel may be any one of:
a serial binary digital optical channel;
a parallel binary digital optical channel;
a serial binary digital electrical channel;
a parallel binary digital electrical channel;
a serial multilevel digital electrical channel;
a parallel multilevel digital electrical channel;
or an analogue electrical channel;

The control channel may have the same bandwidth as that of the optical communications channel or it may have a lower bandwidth.

The optical communications channel may be free space or it may be formed by an optical waveguide such as an optical fiber or it may form part of an integrated optical device.

The optical source may be a laser or an LED and the drive current supplied to the optical source can be tailored to the characteristics of the source by individually adjusting the current drive levels such that each of the optical power levels is sufficiently separated from the levels above and below it for the receiver to quantise each level and maintain an adequate bit error rate, thus accommodating non linear source output power versus drive current characteristics.

An embodiment of the present invention will now be described by way of example with reference to the accompanying drawings, in which:

FIG. 1 schematically illustrates a data communications link in accordance with the present invention;

Figure 1:
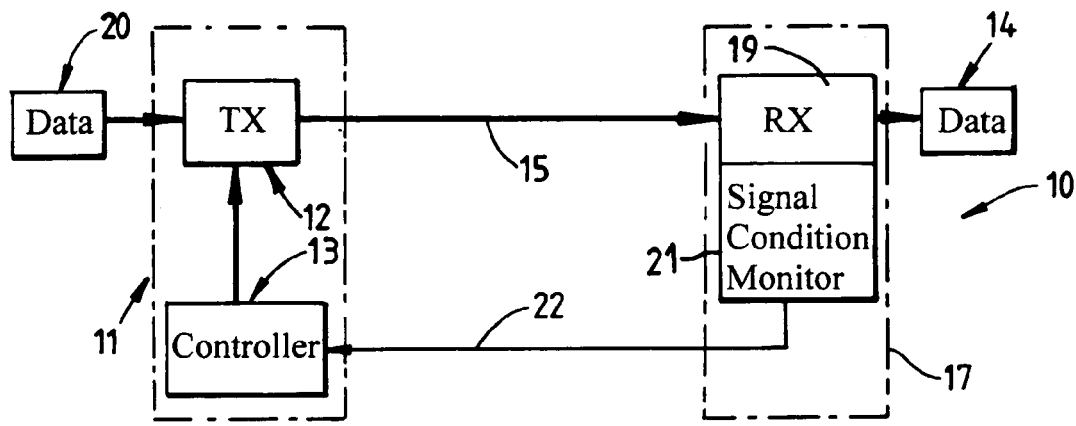

As is illustrated in FIG. 1 a data communications link 10 in accordance with the present invention comprises a data transmitter station 11 coupled by an optical communications channel 15 to a data receiver station 17. The transmitter station 11 includes a transmitter 12 having a multi-level optical source (as will be explained) connected to receive data words of n digital bits from a data source 20. Station 11 encodes the bits of each word into m optical power levels and transmits the optical signal along channel 15 to station 17.

Receiver station 17 includes a data decoding receiver 19 which converts the received multipower level optical signal into n bit digital words and outputs these to a data consumer station 14. A received signal condition monitor 21 forming part of station 17 is connected via a return or control channel 22 to a control device 13 forming part of station 11. Monitor 21 is arranged to sense the level of a predetermined characteristic of the signal received by the receiver 19 and consequently to transmit a control signal along the control channel 22 to the control device 13.

The control device 13 is arranged to control the power output of the transmitter 12 so as to achieve a predetermined level of the sensed characteristic in the receiver station 17.

Figure 2:
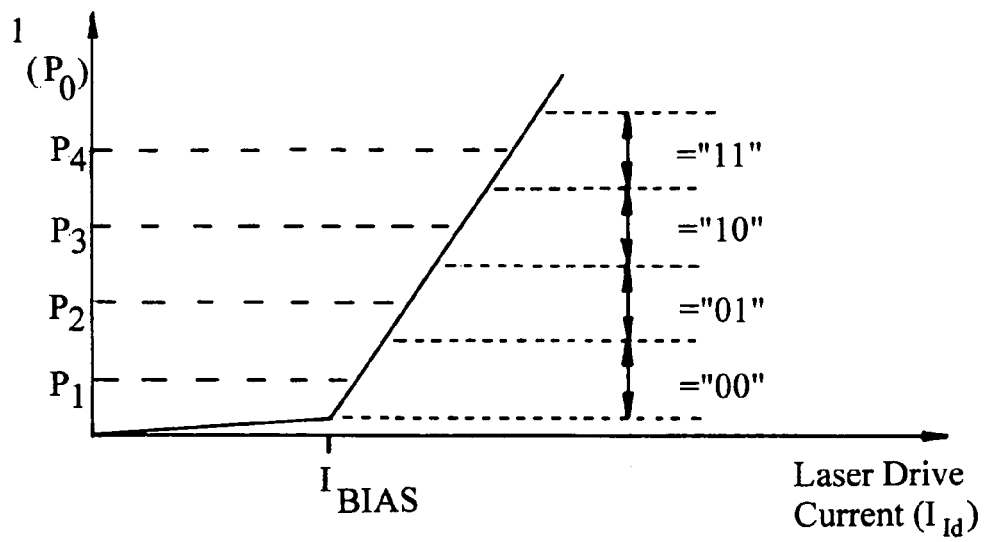
FIG. 2 illustrates a multi-level data encoding scheme for use in the FIG. 1 link

The transmitter 12 is arranged to receive n bit digital words from the source 20, either in series or in parallel, and to convert these into one of m different optical power levels for outputting along channel 15. This effectively enlarges the bandwidth of channel 15. One example of this encoding process is illustrated in FIG. 2 for two bit digital words which are encoded into four power levels. Thus word '00' is encoded into power level $P_1$; word '01' is encoded into power level $P_2$ etc. There are, of course, numerous other encoding schemes but in general any sequence of n digital bits can be represented by m optical power levels where $m=2^n$.

The major problem inherent in multilevel encoding methods is that the minimum optical power required at the receiver for a given symbol error rate increases with m and for example a four level scheme has a minimum optical power requirement of four times that of a dual level scheme with an equivalent symbol error rate if a fixed separation between each of the power levels is to be maintained. A reduced power level difference can be used but symbol error rate increases as separation between adjacent optical power levels $P_1$, $P_2$, etc., decreases. On the other hand excess optical power results in back reflections from the channel 15 and these may be particularly significant in very short links. It is, therefore, desirable in short links to operate with controlled power consistent with minimising back reflections and also minimising symbol error rates.

Figure 3:
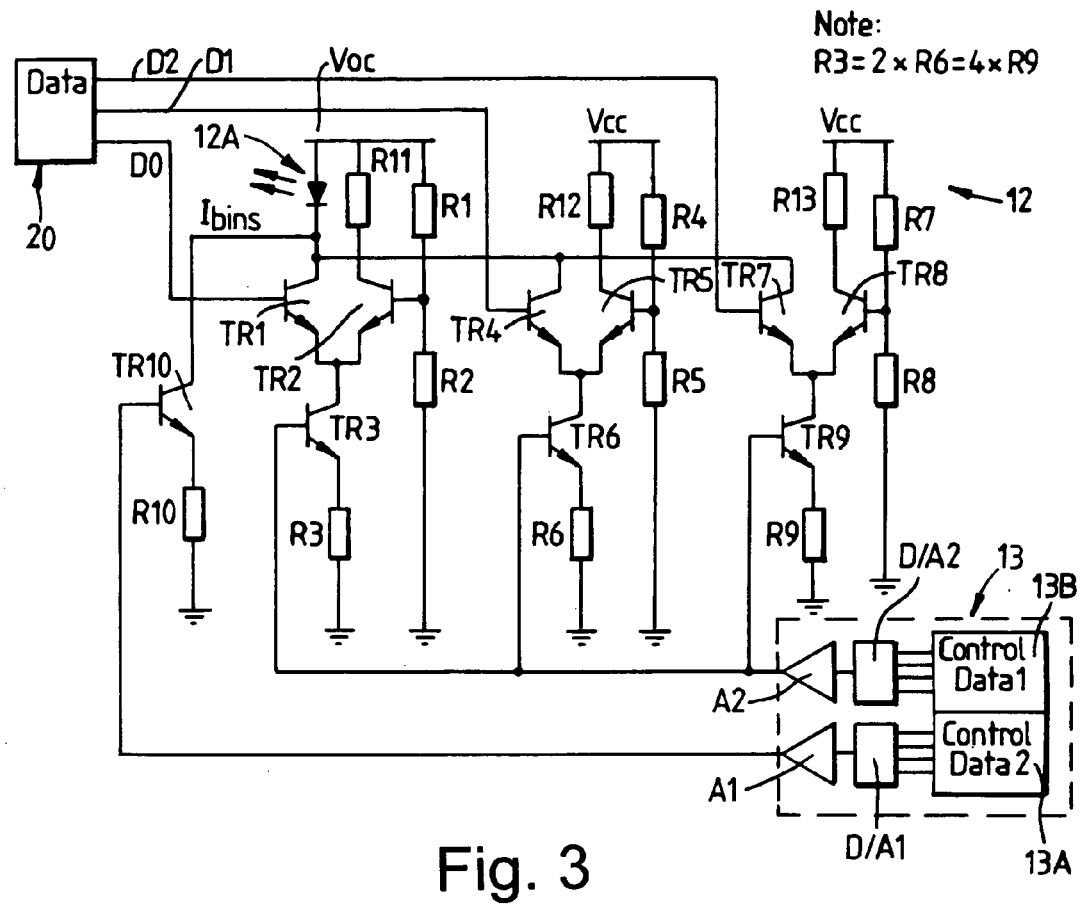
FIG. 3 illustrates an encoding transmitter circuit for use in the FIG. 1 link.

FIG. 3 illustrates encoding of three bit digital words delivered by source 20 to a transmitter 12 incorporating a LED 12A as the optical source. The encoding circuit has three constant current sources which are connected in parallel with each other and in series with LED 12A and the current sources are switched in or out depending upon the binary level of the corresponding input data bit $D_1$, $D_2$, $D_3$. Control device 13 is also illustrated schematically having an analogue current output driven by amplifier A2 which controls or modulates the three current sources in common. The control device 13 may be implemented, for example, by a microcontroller or an integrated circuit or by discreet electronic components which receive an input as previously explained from control channel 22.

Since the LED 12A has a Power/Current characteristic as shown in FIG. 2 a bias current source (TR10) is connected in parallel with the LED 12A to deliver a bias current $I_{BIAS}$ to enable the drive current to be above the lasing current threshold at all times. The bias current $I_{BIAS}$ is variable and in particular is controlled by a further analogue current output from the control device 13 (driven by amplifier A1) to set the minimum optical power level. Control of the bias point in this manner not only reduces the switching time (from one power level to another) and the attendant heating effect in a semi-conductor laser diode but also compensates for the changing Power/Current characteristic due to temperature drift.

Figure 4:
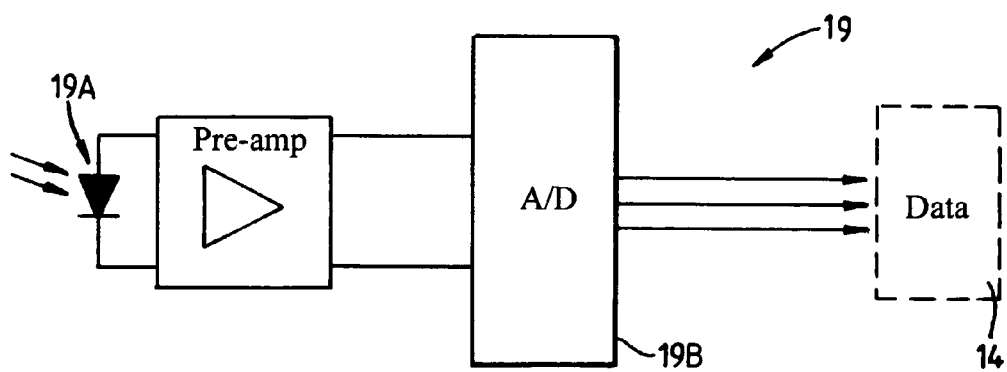
FIG. 4 illustrates a decoding receiver circuit for use in the FIG. 1 link.

FIG. 4 illustrates a form of receiver 19 which is compatible with the FIG. 3 transmitter 12 comprising an opto electronic detector 19A driving an analogue to digital converter 19B via a preamplifier. The output of converter 19B supplies the data to the consumer station 14. The converter 19B quantises the received signal amplitude into one of the predetermined power levels to thereby evaluate the encoded n-bit data word. The signal condition monitor 21 may be connected to measure the amplitude of the output from the preamplifier to monitor the DC level of the signal received by the receiver or to monitor the average power level of the received signal. Alternatively the condition monitor 21 may be connected to the data output lines from the analogue to digital converter 19B when the monitored characteristic is the bit content of a transmitted test word.

Figure 5:
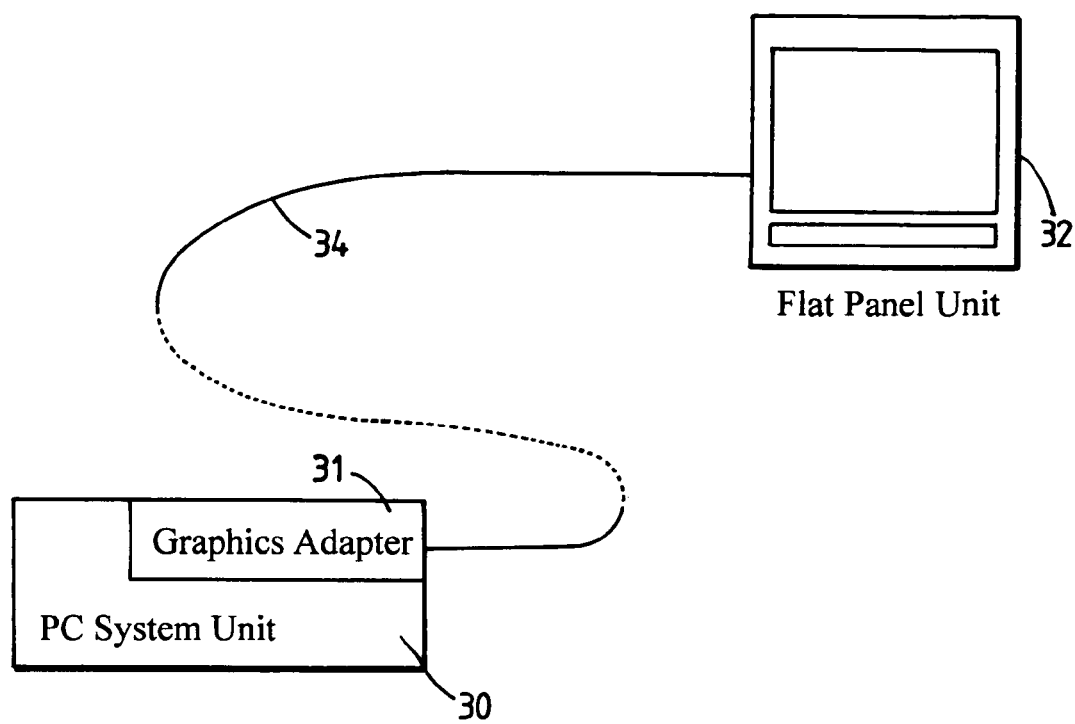
FIG. 5 illustrates the FIG. 1 link interconnecting a computer with a visual display unit.

By way of example the link 10 may interconnect a personal computer 30 with a visual display 32, using an optical fibre 34 for channel 15 as schematically illustrated in FIG. 5. In such a circumstance the fibre 34 would have a total length of a few hundred meters, for example 150 meters or less. The host computer system passes high bandwidth display data to the graphics adaptor card 31 where the data is encoded and serialised to generate a four bit wide high speed data bus which is transferred to the laser diode driver circuit. The four bits wide data is converted into sixteen unique light levels by the laser diode drive circuit and the optical signal is then transmitted via the fibre optic cable 34 to the display 32. The electrical to optical conversion is achieved by using the four input digital signals to control the drive currents of a set of four current mirrors in parallel with each other and in series with the laser diode in a circuit similar to that of FIG. 3. The current mirror ratios are fixed such that the most significant bit switches a current which is twice that of the next most significant bit which in turn switches a current which is twice that of the next most significant bit which in turn switches a current which is twice that of the least significant bit. At the display 32 the 16 level optical data is converted by a circuit similar to that of FIG. 4 to restore the four bit wide binary data. This is then decoded at consumer station 14 to recover the display data which is passed to the output of display 32.

The control signal from the display 32 to the PC system 30 may be along the same optical fibre 34 by using a different carrier frequency or it may be along a separate fibre but at the graphics adaptor card 31 of the PC system 30 the return signal is received and converted to a binary electrical signal which after comparison with a reference supplies the two currents to the diode laser, the first for bias at threshold ($I_{BIAS}$) and the second for modulation current to the data bit switched current sources as previously explained.

Figure 6A:
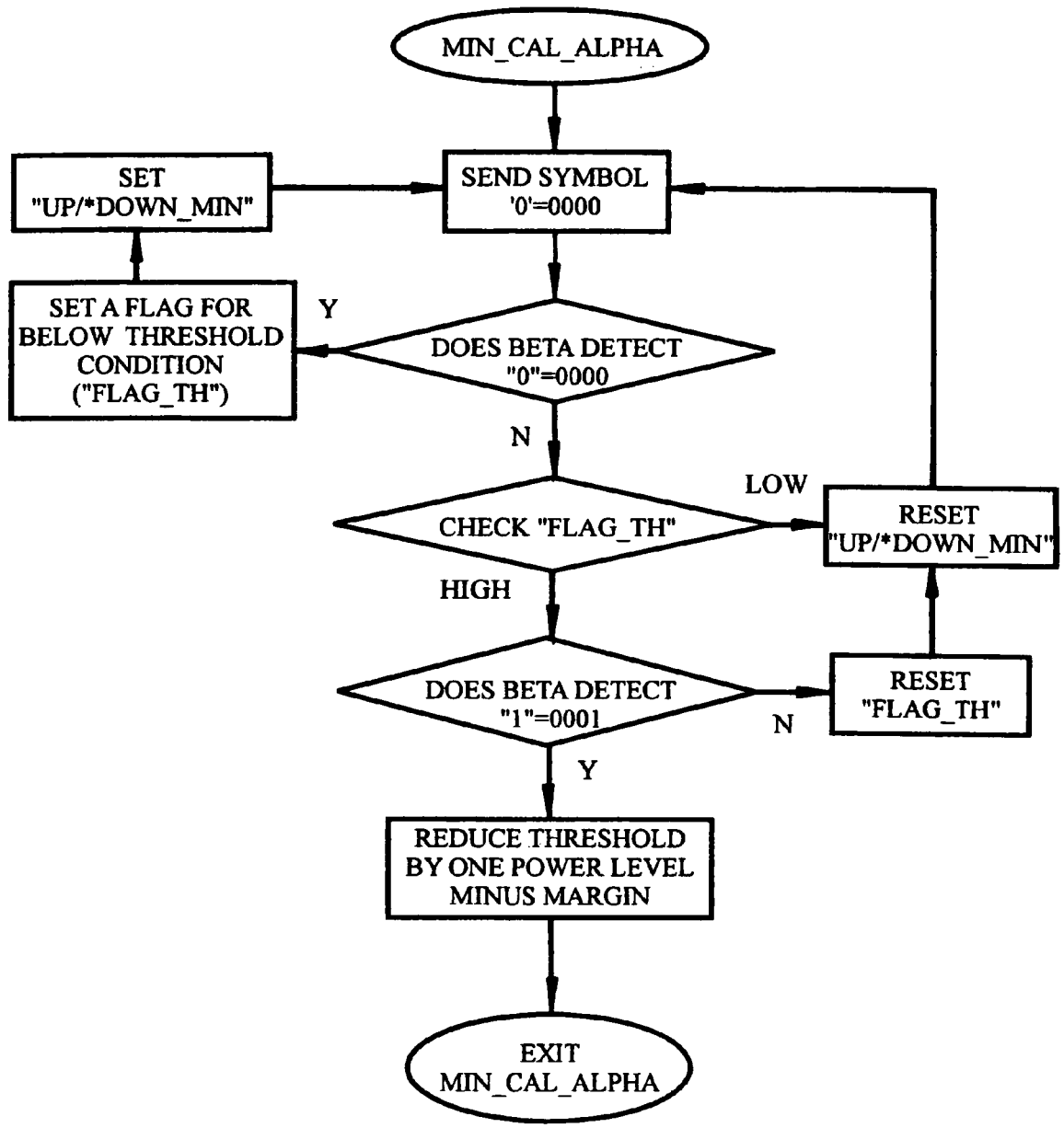
FIG. 6 is a flow diagram of a calibration and control protocol used in the FIG. 5 system.
Figure 6B:
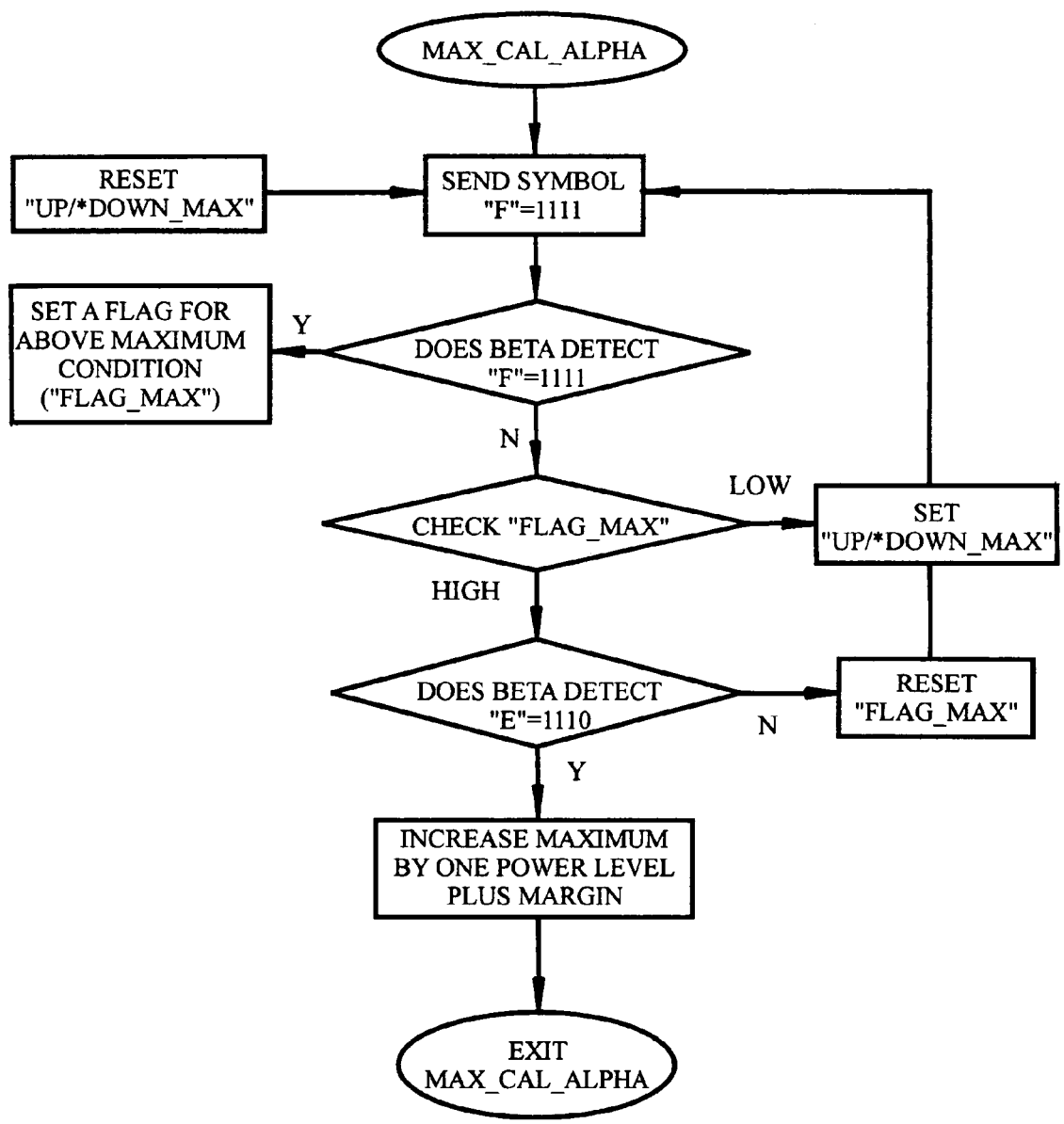

Additionally the control signal from the return path 22 is used in the start-up procedure to calibrate the multi-level optical signal by tailoring the various drive currents. In particular a two part start-up auto-calibration algorithm is performed using calibration frames during display blanking periods and/or breaks in the transmitted data streams. The calibration and control protocols are illustrated in the flow diagrams of FIG. 6A and FIG. 6B. The algorithm of the FIG. 6A protocol is used to set $I_{BIAS}$ in FIG. 3 so that the lasing threshold is achieved and is implemented in sub-unit 13A of control device 13. The algorithm of the FIG. 6B protocol is used to set the modulation level for the bit matched current sources to a suitable maximum and is implemented in sub-unit 13B of control device 13. In each case the return channel 22 transmits the detected value at the receiver 19 which the control device 13 compares with a present value in order to provide the required control output signal. The auto-calibration protocols are repeated throughout use of the link and allow the drive circuits for the optical source to be controlled such that the separation of optical power between adjacent levels is sufficient to ensure a low bit error rate. This allows for compensation of varying losses in the link, for varying source efficiency such as due to temperature drift, and for general reduction in source output power due to lifting effects.

The transmitter 12 and receiver 19 may be DC coupled since there is no requirement for DC balancing in the quantisation stage within the receiver 19. This arises by virtue of the optical output of the source being automatically calibrated to meet the required optical power level at the receiver due to the auto-calibration protocol. DC offset and DC drift in the receiver are separately corrected by any one of a number of known methods.

The multi-level link conveniently operates in a binary digital mode during the initial calibration steps by modulating the laser with the most significant bit of the data only and then monitoring the most significant bit at the receiver.

A progression to multiple levels then follows as each level of the link is established. The required bias current is determined first by the calibration routine of FIG. 6A but once this is set the optical power for the maximum level is fixed via the FIG. 6B protocol to provide the desired maximum power at the receiver which is consistent with low power dissipation at the source and low back reflections from the link. Subsequent power levels are then set proportionally within the determined range or individually in the event that the optical source has a non-linear power v current characteristic.

Figure 7:
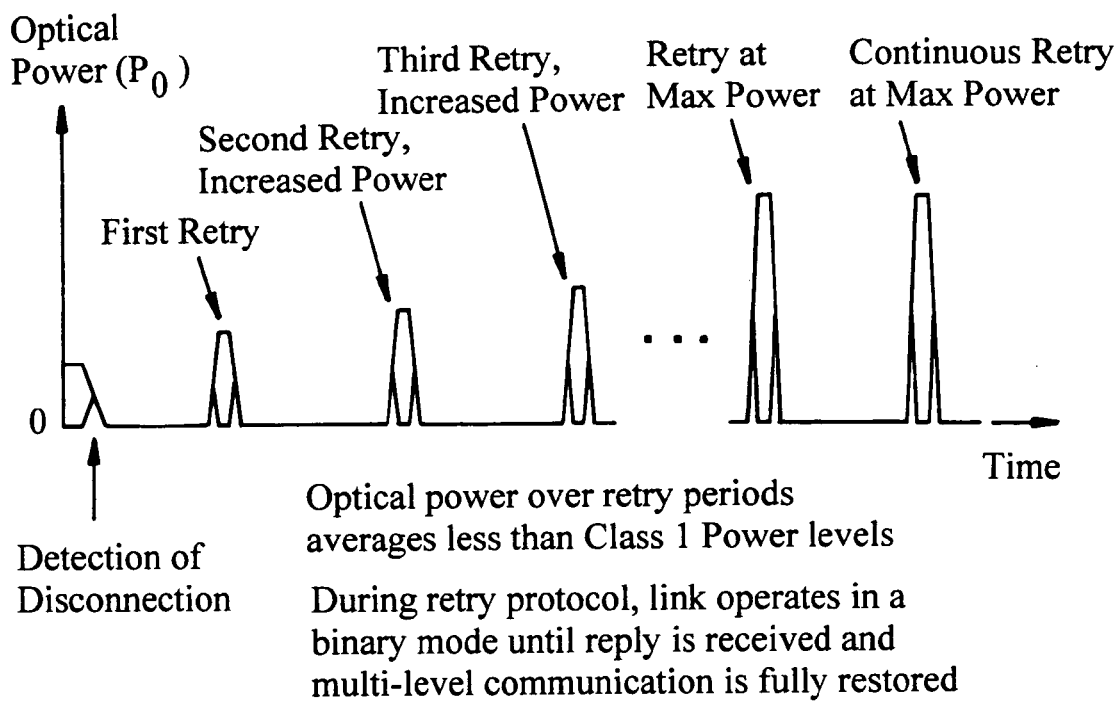
FIG. 7 illustrates operation of the link in the FIG. 5 system following a data disconnection.

The return channel 22 also enables operation of an interlock function in that the optical source may be wholly or partially disabled when there is an absence of feedback from the receiver despite the optical source being at maximum output. Subsequent attempts to re-establish communications at fixed time intervals is possible without significant increase in exposure of the user to laser output by means of pulse limiting using the scheme schematically illustrated in FIG. 7. This is possible because there is no requirement to DC balance the code.

Figure 8:
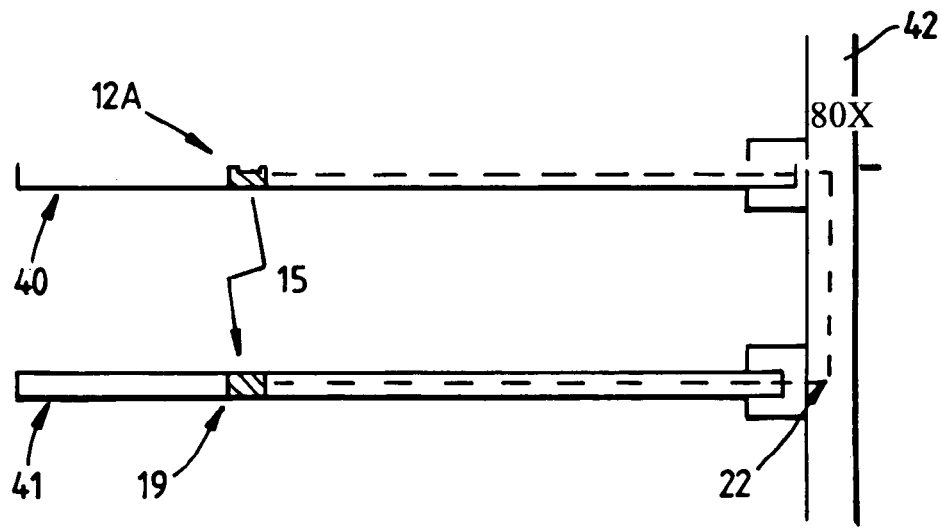
FIG. 8 illustrates an embodiment of the present invention implemented to provide communication between printed circuit boards in a computer system.

By way of a further example of use of the link 10 it may be implemented to interconnect printed circuit boards within a computer system as schematically illustrated in FIG. 8. In FIG. 8 the source 12A is embedded in a first printed circuit board 40 whilst the opto-electronic detector 19A is embedded in a second printed circuit board 41. The boards 40, 41 are generally adjacent and mutually parallel being each mounted on a common mother-board 42. The optical channel 15 is formed by a free space transmission between the boards 40, 41 whereas the return channel 22 is backplane supported and is an electrical signal, either analogue or digital.

The invention claimed is:

1. A data communication link comprising a data transmitter station coupled by an optical communication channel to a data receiver station,
wherein the data transmitter station includes a multi-power-level optical source connected to receive data words of n digital bits, wherein said data transmitter encodes different value words in the data word into different power levels of a signal having m optical power levels, where m is greater than two, wherein different sequences of bits comprised of more than one bit are encoded into different power levels of the signal, wherein said data transmitter transmits the multi-power-level output signal of the optical source along the optical communications channel to the data receiver station, said data receiver station including a data-decoding receiver arranged to receive and decode said multi-power level signal into n bit digital words,
and wherein said receiver station further comprises a received-signal condition monitor coupled by a control channel to a control device located in the data transmitter station, said condition monitor being arranged to sense the level of a predetermined characteristic of each of the power levels of the multi-power-level output signal received by the data-decoding receiver and consequently to transmit control signals along the control channel to the control device to adjust the laser drive current for each of the power levels to provide adequate bit error rate for each of the power levels to transmit the multi-Power-level output signal,
said control device being adapted to control the power output of the optical source for each power level consistent with achieving a predetermined sensed level of said predetermined characteristic for each power level used to transmit the multi-power-level output signal.

2. A data communication link as claimed in claim 1, wherein the predetermined characteristic is the DC level or the average optical power level of the signal received by the receiver, the sensed level being compared against a control or reference level to establish a difference and the arrangement is such that the control signal attempts to null that difference or a least to keep the difference within narrow predetermined limits.

3. A data communication link as claimed in claim 1, wherein the predetermined characteristic is the individual bit content of a multibit test word transmitted at preselected times the condition monitor being preprogrammed with the bits of the test word against which the individual bits of the transmitted test word are compared and in the event of a difference the control signal is arranged to increase or decrease the power output of the transmitter in order to reduce the error.

4. A data communication link as claimed in claim 1, wherein the control channel is any of:
a serial binary digital optical channel;
a parallel binary digital optical channel;
a serial binary digital electrical channel;
a parallel binary digital electrical channel;
a serial multilevel digital electrical channel;
a parallel multilevel digital electrical channel;
or an analog electrical channel.

5. A data communication link as claimed in claim 1, wherein the bandwidth of the optical channel is the same as or greater than that of the control channel.

6. A data communication link as claimed in claim 1, wherein the optical source is a laser or an LED and the drive current supplied to the optical source is tailored to the characteristics of the source by individually adjusting the current drive levels such that each of the optical power levels is sufficiently separated from the levels above and below it for the receiver to quantize each level and maintain an adequate bit error rate, thus accommodating non linear source output power versus drive current characteristics.

7. A data communication link as claimed in claim 1, wherein said communication channel and control channel are the same channel.

8. A data communication link comprising a data transmitter station coupled by an optical communication channel to a data receiver station,
wherein the data transmitter station includes a multi-power-level optical source connected to receive data words of n digital bits, wherein said data transmitter encodes different value words in the data word into different power levels of a signal having m optical power levels, where m is greater than two, wherein different sequences of bits comprised of more than one bit are encoded into different power levels of the signal, wherein more than one bit may be encoded into the same power level, wherein said data transmitter transmits the multi-power-level output signal of the optical source along the optical communications channel to the data receiver station, said data receiver station including a data-decoding receiver arranged to receive and decode said multi-power level signal into n bit digital words,
and wherein said receiver station further comprises a received-signal condition monitor coupled by a control channel to a control device located in the data transmitter station, said condition monitor being arranged to sense the level of a predetermined characteristic of each of the power levels of the multi-power-level output signal received by the data-decoding receiver and consequently to transmit a control signals along the control channel to the control device to adjust the laser drive current for each of the power levels to provide adequate bit error rate for each of the power levels used to transmit the multi-power-level output signal, said control device being adapted to control the power output of the optical source for each power level consistent with achieving a predetermined sensed level of said predetermined characteristic for each power level used to transmit the multi-power-level output signal.

9. A data communication link as claimed in claim 8, wherein the predetermined characteristic is the DC level or the average optical power level of the signal received by the receiver, the sensed level being compared against a control or reference level to establish a difference and the arrangement is such that the control signal attempts to null that difference or a least to keep the difference within narrow predetermined limits.

10. A data communication link as claimed in claim 8, wherein the predetermined characteristic is the individual bit content of a multibit test word transmitted at preselected times the condition monitor being preprogrammed with the bits of the test word against which the individual bits of the transmitted test word are compared and in the event of a difference the control signal is arranged to increase or decrease the power output of the transmitter in order to reduce the error.

11. A data communication link as claimed in claim 8, wherein the control channel is any of:
 a serial binary digital optical channel;
 a parallel binary digital optical channel;
 a serial binary digital electrical channel;
 a parallel binary digital electrical channel;
 a serial multilevel digital electrical channel;
 a parallel multilevel digital electrical channel;
 or an analog electrical channel.

12. A data communication link as claimed in claim 8, wherein the bandwidth of the optical channel is the same as or greater than that of the control channel.

13. A data communication link as claimed in claim 8, wherein the optical source is a laser or an LED and the drive current supplied to the optical source is tailored to the characteristics of the source by individually adjusting the current drive levels such that each of the optical power levels is sufficiently separated from the levels above and below it for the receiver to quantize each level and maintain an adequate bit error rate, thus accommodating non linear source output power versus drive current characteristics.

* * * * *